United States Patent [19]
Mattiussi et al.

[11] 3,906,060
[45] Sept. 16, 1975

[54] COATING COMPOSTIONS FOR METAL SUBSTRATES BASED ON ETHYLENETETRAFLUOROETHYLENE COPOLYMERS

[75] Inventors: Andrea Mattiussi; Mario Modena, both of Bollate, Italy

[73] Assignee: Montecatini Edison S.p.A., Milan, Italy

[22] Filed: June 25, 1973

[21] Appl. No.: 373,163

[30] Foreign Application Priority Data
June 28, 1972 Italy.................................. 26325/72

[52] U.S. Cl....... 260/897 C; 117/132 CF; 260/30.2; 260/30.4 R; 260/30.6; 260/30.8; 260/31.8 M; 260/31.6; 260/32.4; 260/32.6 R; 260/32.8 R; 260/33.2 R; 260/33.4 F; 260/33.6 F; 260/42.27
[51] Int. Cl. .............................................. C08f 29/22
[58] Field of Search........................ 260/897 C, 900

[56] References Cited
UNITED STATES PATENTS
2,412,960   12/1946   Berry.................................. 260/32
3,147,323   9/1964   Boyer.................................. 264/211
3,334,157   8/1967   Larsen................................ 260/897

FOREIGN PATENTS OR APPLICATIONS
1,166,020   10/1969   United Kingdom............ 260/87.5 A

*Primary Examiner*—John C. Bleutge
*Assistant Examiner*—C. J. Seccuro
*Attorney, Agent, or Firm*—Hubbell, Cohen and Stiefel

[57] ABSTRACT

Coating compositions for metal substrates comprising a mixture of ethylene-tetrafluoroethylene copolymers, said mixture including an ethylene-tetrafluoroethylene copolymer having 50–60 mol % of tetrafluoroethylene with a melting point from about 250°C to about 315°C and an ethylene-tetrafluoroethylene copolymer having more than 60 or less than 45 mol % of tetrafluoroethylene with a melting point from about 180° to about 285°C and a latent solvent. The composition may optionally include a fluidizing solvent and various pigments, inert fillers and other additives.

9 Claims, No Drawings

3,906,060

COATING COMPOSITIONS FOR METAL SUBSTRATES BASED ON ETHYLENETETRAFLUOROETHYLENE COPOLYMERS

CROSS REFERENCE TO RELATED APPLICATIONS

None.

BACKGROUND OF THE INVENTION

1. Field of the Invention

The present invention relates to coating compositions based on ethylene-tetrafluoroethylene, (hereinafter referred to as E-TFE) copolymers, which capable of forming films that are adhere perfectly to metal surfaces of different types, even after aging.

2. Prior Art

It is well known that E-TFE copolymers have certain desirable physical and chemical characteristics, such as substantial inertia to chemical reactants in general, good thermal stability and excellent dielectric properties.

In U.S. patent application Ser. No. 142,357, now abandoned, coating compositions based on fluorinated polymeric materials consisting of E-TFE copolymers containing from 50 to 70 mol % of chemically combined tetrafluoroethylene are disclosed.

In fact, it has been found that those coating compositions are capable of yielding films that adhere perfectly to metal surfaces of different types, even after aging.

However, it was also found that the filming properties of those compositions are not quite as good as desired. In fact, in order to obtain complete and reproducible filming of the compositions containing copolymers of such a composition (50–60 mol % of tetrafluoroethylene) as to have a melting point near the maximum value typical of this class of polymeric materials, it is necessary to effect a thermal baking treatment of the coated metal surface at temperatures above 300°C and for baking times often exceeding two or three minutes.

This requirement for extended thermal baking represents a considerable limitation in the use and a serious disadvantage for such coating compositions. This is especially so when one considers that the required coating conditions greatly exceed the conditions attainable in the standard machines that are commercially used for the continuous coating of metal substrates. Thus, these machines cannot be used with the above described polymeric compositions.

SUMMARY OF THE INVENTION

An object of the present invention is to provide coating compositions, based on E-TFE copolymers, which are free from the disadvantages mentioned above with respect to the known compositions.

According to the present invention, this and other objects are attained with polymeric coating compositions based on E-TFE copolymers which contain as the fluorinated polymeric material, a mixture of:

a. at least one E-TFE copolymer having a melting point from about 250° to about 315°C and containing from 50 to 60 mol % of chemically combined tetrafluoroethylene, and b. at least one E-TFE copolymer having a melting point from about 180° to about 285°C and containing more than 60 mol % or less than 45 mol % of chemically combined tetrafluoroethylene.

Preferably, the higher melting E-TFE copolymers (a) contain from 52 to 58 mol % of chemically combined tetrafluoroethylene, while the lower melting copolymers (b) contain from 35 to 45 mol % or from 60 to 70 mol % of chemically combined tetrafluoroethylene.

As a matter of fact, it has surprisingly been found that with polymeric compositions of the type hereinabove described, it is possible to effect complete filming with maximum of reproducibility, at temperatures between about 260° and 300°C, and with baking times between 1 and 2 minutes. These conditions are quite typical for the equipment used on a commercial scale for the continuous industrial coating of metal substrates with coating compositions based on polymeric materials in general.

In the compositions according to this invention, the ratio between the above-described copolymers (a) and (b) may vary within rather wide limits, depending on the type of coating to be obtained, on the type of substrate to be coated and on the conditions under which the coating is to be performed.

When copolymer (b) contains less than 45 mol % of tetrafluoroethylene, it is preferred to use it in amounts below 50% by weight of the total weight of (a) + (b), in order not to diminish the excellent resistance of the coating film against chemical atmospheric agents which results from the presence of copolymer (a).

The mixture of copolymers (a) + (b), which is to be used as the polymeric component of the compositions according to this invention may be prepared either by mixing the two copolymers together in the form of powders thereof, or by mixing aqueous dispersions of the two copolymers.

The polymeric compositions according to this invention comprise, in addition to the above specified admixture of copolymers (a) and (b), at least one latent solvent and, optionally, at least one fluidizing solvent, at least one inert pigment and other additives of the type well known to those skilled in the art of coating compositions.

As used herein, the term "latent solvent" is intended to mean those organic compounds capable of exerting a solvent action on the E-TFE copolymers at high temperatures and generally above 100°C, thereby allowing one to obtain a homogeneous copolymer film after the elimination of the latent solvent.

Examples of such latent solvents are the alkyl and alkoxyl ($C_1$ – $C_{12}$) esters of aliphatic and aromatic mono- and polycarboxylic acids, such as dimethyladipate, dimethylsebacate, diethylsuccinate, dimethylphthalate, dibutylphthalate, diisobutylphthalate, dibutyladipate, dibutylsebacate, 2-methoxyethylacetate, 2-butyloxyethylacetate, dimethoxyethylphthalate, and the like; glycol-ethers and glycol-esters such as diethyleneglycolmonomethyletheracetate, diethylene-glycolmonobutylethereacetate, and the like; cyclic ethers such as dioxane, tetrahydrofuran, and the like; alkylenecarbonates such as ethylenecarbonate, propylene carbonate, and the like; lactones such as butyrolactone, valerolactone, and the like; nitroalkanes such as nitromethane, nitroethane, 1-nitropropane, 2-nitropropane, and the like; sulfones such as cyclobutadiensulfone, tetramethylensulfone, dimethylsulfolane, hexamethylensulfone, and the like; nitriles such as dicyanobutene, adiponitrile, and the like; amides such as N, N-dimethylformamide, N, N-diethylformamide, N, N-dimethylacetamide and the like; pyrrolidone and alkyl derivatives thereof such as N-methyl-2-pyrrolidone, N-ethyl-2-pyrrolidone, and the like; organic phosphates and phosphites such as diethylphosphate, tricresylphosphate, and the like.

These compounds may be used either alone or in admixture with each other.

A preferred group of latent solvents are the high boiling esters such as dibutylphthalate, diisooctylphthalate, dimethylphthalate, dibutyladipate, dibutylsebacate, tricresylphosphate and other similar compounds.

As used herein, the term "fluidizing solvent" is intended to mean organic compounds which are more volatile than the latent solvents and which are capable of imparting to the copolymer-latent solvent system a viscosity such as will allow the spreading of the resulting composition on substrates of various types following well known techniques and using standard equipment, such as for instance dipping, spraying, roller-spreading, the use of spiral film-spreaders, blade-film-spreaders and the like.

Examples for these fluidizing solvents are ketones such as methylethylketone, methylisobutylketone, ethylamylketone, acetone, diaceton-alcohol, cyclohexanone, isophorone, mesityl oxide, and the like; aromatic hydrocarbons such as benzene, toluene, xylenes, and the like; low boiling esters such as ethyl acetate, amyl butyrate, and the like; low boiling glycols such as ethylene and propylene glycol, derivatives thereof and other similar compounds.

These compounds may be used either alone or in admixture with each other.

The pigments and inert fillers optionally used in the coating compositions according to the invention may be selected from a large group of organic and inorganic thermally resistant substances of the type well known to those skilled in the art of coating compositions.

In the case of coating compositions of a white color, the preferred pigment is titanium dioxide.

The nature of the various components, as well as the ratios by weight between the E-TFE copolymers/latent solvent/fluidizing solvent/pigment in the coating compositions of the invention vary over wide limits depending on the ultimate use for which they are intended, and more particularly they depend on the type of substrate to be coated, on the spreading conditions and on the thermal treatment of the coating composition itself.

Particularly advantageous results may be obtained by using coating compositions comprising:

| | |
|---|---|
| E-TFE copolymers (in powder form) | 100 parts by weight |
| latent solvent | 100–500 parts by weight |
| fluidizing solvent | 0–50 parts by weight |
| pigment | 0–150 parts by weight |

In addition to the above mentioned components, the compositions according to the invention may also include minor amounts of other additives such as surfactants, stabilizers, anti-oxidants, UV absorbers and the like.

For special applications the fluidizing solvent may be omitted.

DESCRIPTION OF THE PREFERRED EMBODIMENTS

The coating compositions according to the invention may be prepared and applied to substrates according to techniques well known in the art.

Thus, according to a preferred laboratory method, the coating compositions according to this invention are prepared by a process that comprises in order, the following operational steps:

1. Introducing into a quick mixer the entire quantity of latent solvent; although in the case of a pigment containing composition, only a portion of the latent solvent should be introduced.
2. Adding about one-third of the copolymer mixture in powder form.
3. When a pigment is to be included in the composition, adding same with the remaining portion of the latent solvent.
4. Stirring the thus obtained mixture, for about 2–3 minutes at high velocity.
5. Adding the remaining two-thirds of the powdered copolymer mixture in subsequent portions and vigorously stirring the mixture for 2–3 minutes between each addition.
6. Subjecting the thus obtained mixture to a final stirring for 3–4 minutes.
7. Introducing suitable portions of the fluidizing solvent during the mixing step, in order to conveniently adjust the viscosity of the system.
8. Degassing the obtained dispersion of the copolymers at reduced pressure.

This dispersion is then ready for use as a varnish that may be applied on different types of metal substrates such as, for example, steel, soft steel, phosphatized soft steel, galvanized sheet iron, aluminum, chromated aluminum and the like.

The methods and equipment most commonly used for applying the present coating compositions to a substrate are as follows:

A. Spreading the composition on the substrate by means of a spiral filmspreader; or
   Spreading the composition on the substrate by means of a blade filmspreader.
B. Immersion of the substrate into the composition.
C. Use of a spray-gun.
D. Application by means of spreading rollers.

Depending on the spreading method used, coating compositions having different viscosities may be used.

Once a coating composition according to the invention has been applied to the substrate, it is then subjected to thermal treatment in an oven.

Advantageous results are obtained with the coating compositions of the invention, when the thermal treatment is effected at temperatures between about 260° and 300°C for from 1 to 2 minutes.

As a result of this thermal treatment, the latent and fluidizing solvents evaporate and the polymeric material deposits on the substrate in the form of a continuous and homogeneous film that is perfectly adherent, even after natural or artificial aging, after indenting, bending and boiling.

The coating films obtained by thermal treatment of the compositions according to the invention, are subjected to a series of tests for evaluating the following characteristics:
   adherence hardness
bending resistance
cupping strength in an Erichsen Model 225 D
impact resistance
brightness
resistance to aging; aging:
  a. in an air circulating oven at 150°C;
  b. in water heated to 70°C;
  c. in an artificial weather aging machine (Weather-Ometer) with a carbon arc;
  d. in a salty nebulation chamber (35°C; 5% NaCl solution);
  e. in a humidostatic chamber at 40°C and 100% relative humidity; and
  f. by immersion of a coated metallic sample having a squared grid in boiling water and bending of the squared zone.

The coating compositions of the invention, after the above described thermal treatment, result in coating films generally endowed with good adhering characteristics, even after the various aging treatments described above. The bending resistance and the impact resistance are also good and remain so even after the various agings.

The following examples are given to further illustrate the invention without, however, being a limitation thereof. All parts are by weight unless otherwise indicated.

EXAMPLE 1

A. A coating composition was prepared by mixing in a ball mill for 24 hours:
| | |
|---|---|
| E-TFE copolymers (1) | 100 parts |
| latent solvent (2) | 225 parts |
| fluidizing solvent (3) | 35 parts |

1. A mechanical mixture of copolymers was used consisting of 90 parts of a copolymer containing 55 mol % of tetrafluoroethylene and having a melting point of about 275°C (determined by differential thermal analysis) and 10 parts of a copolymer containing 41 mol % of tetrafluoroethylene and having a melting point of about 220°C. The copolymers were in the form of powders having an average particle size of 0.4 micron, both copolymers having a melt-flow-index value (according to ASTM 1238, 65T) at 300°C, load 3160 g, equal to 0.5.

2. Dibutylphthalate.

3. A commercial product known as "Cellosolve" and consisting of $C_2H_5O-CH_2-CH_2OH$ (monoethylether of ethylene glycol) was used.

B. For comparative purposes, another coating composition was prepared exclusively based on a copolymer containing 55 mol % of tetrafluoroethylene.

For this purpose, a mixture consisting of the copolymer, the same latent solvent and the same fluidizing solvent in the same weight ratios used in case (A) was prepared in a ball mill.

C. For comparative purposes, and following the same procedures adopted in (A) and (B) above, a third coating composition exclusively based on a copolymer containing 41 mol % of tetrafluoroethylene was prepared.

Compositions (A), (B) and (C) were applied onto three different metal substrates using a spiral film-spreader (No. 36). The three substrates were: 0.5 – 0.8 mm thick sheets of aluminum, bright steel and chromated aluminum (a commercial product known as Bonder AL 20, trademark of Montecatini Edison S.p.A. - Italy).

Compositions (A), (B) and (C) were filmed in an oven at 300°C, for 2 minutes. After this thermal treatment all the specimens (sheets) treated with (A) and (C) appeared perfectly coated; on the contrary, a high percentage (70–80%) of those specimens that were treated with (B) showed conspicuous faults (shrinkages, flaws, cracks, etc.).

Some of the characteristics of the coating films are summarized in Table I.

These characteristics on the whole are quite satisfactory for all three compositions. It should be noted however, that the coating films of composition (C), based on a copolymer having a tetrafluoroethylene content below 50 mol %, show a reduced resistance to chemical agents and atmospheric attacks. This is in accordance with the data reported in application Ser. No. 142,357.

TABLE I

| Composition | Substrate | Film Thickness | Adherence (1) | Impact resistance (2) | Hardness (3) | Resistance to Bending (4) (a) (b) | Resistance to Bending and boiling (5) residual adherance | Resistance in Water bath at 70°C (6) |
|---|---|---|---|---|---|---|---|---|
| (A) | Aluminum | 15 microns | 100% | 10 (unaltered) | 2H | unaltered OT | 100% | unaltered |
|  | Bright steel | 15 microns | 100% | 10 (unaltered) | 2H | unaltered OT | none | unaltered |
|  | Chromium plated Aluminum | 15 microns | 100% | 10 (unaltered) | 2H | unaltered OT | 100% | unaltered |
| (B) | Aluminum | 15 microns | 100% | 10 (unaltered) | 2H | unaltered OT | 100% | unaltered |
|  | Bright steel | 15 microns | 100% | 10 (unaltered) | 2H | unaltered OT | none | unaltered |
|  | Chromium plated Aluminum | 15 microns | 100% | 10 (unaltered) | 2H | unaltered OT | 100% | unaltered |
| (C) | Aluminum | 15 microns | 100% | 10 (unaltered) | 2H | unaltered OT | none | unaltered |
|  | Bright steel | 15 microns | 100% | 10 (unaltered) | 2H | unaltered OT | 100% | unaltered |
|  | Chromium plated Aluminum | 15 microns | 100% | 10 (unaltered) | 2H | unaltered OT | 100% | unaltered |

FOOTNOTES TO TABLE I:
(1) Determined according to the Gardner-Paint Test, Manual-physical and Chemical Examination-Paint, Varnishes, Lacquers and Colors. - XII edition - March 1962 - Published by Gardner Laboratory Inc., USA - page 160; test of the orthogonal grid, square 1 mm; square number 10 × 10.
(2) Determined according to the above cited Gardner-Paint test, page 147; head = 1 kg., diameter 16 mm; height of fall 100 cm; evaluation scale: 10 = unaltered; 6 = light cracks; 3 = evident cracks and 0 = complete detachment.
(3) Determined according to the above cited Gardner test, on page 131, modified in order to also check the compactness of the film according to the ECCA (European Coil Coating Association) method No. 6.
(4) (a) Determined according to the above mentioned Gardner-Test, page 140; (b) according to the ECCA-method N° 7.
(5) Determined according to the test described above on page 9, point f).
(6) Determined on the basis of the appearance of bubbles on the surfaces of the coating, and on the basis of variations in the degree of adherence.

EXAMPLE 2

Two coating compositions were prepared by mixing, in a ball mill, for 24 hours:

| | |
|---|---|
| an E-TFE (A) or (B) copolymer mixture | 100 parts |
| a latent solvent (dibutylphthalate) | 225 parts |
| a fluidizing solvent (methylethylketone) | 35 parts |

A. A mixture consisting of 90 parts of a copolymer containing 55 mol % of tetrafluoroethylene, and 10 parts of a copolymer containing 41 mol % of tetrafluoroethylene was used.

B. A mixture consisting of 90 parts of a copolymer containing 41 mol % of tetrafluoroethylene and 10 parts of a copolymer containing 55 mol % of tetrafluoroethylene was used.

These two compositions were filmed at varying temperatures and for varying times of thermal treatment. Different types of metal substrates were coated with each composition.

All the specimens used were coated with homogeneous films having a thickness between 15 and 20 microns.

The results obtained for some mechanical and physical tests are recorded in Tables II and III.

The tests relating to the resistance characteristics in a salty nebulation chamber are recorded in Tables IV and V.

TABLE II

Coating Characteristics Obtained with mix A (Example 2)

| Filming conditions temperature and time | 280°C; 90 seconds | 280°C; 120 seconds | 290°C; 90 seconds | 290°C; 120 seconds | 300°C; 90 seconds | 300°C; 120 seconds | Substrate |
|---|---|---|---|---|---|---|---|
| % Adherence after bending and boiling in H₂O for 30 minutes | none none | 100% none | 100% none | 100% none | 100% none | 100% none | Aluminum Bright steel |
| Resistance to bending (a) | 1 T | 1 T | 1 T | 1 T | 1 T | 1 T | Aluminum and Bright steel |
| Pencil hardness | H | H | H | H | H | H | Aluminum and Bright steel |

(a) Test carried out with a conical mandrel according to the Gardner-Paint Test, XII Edition (1962) (Publisher Gardner Laboratory Inc. USA), page 140.

TABLE III

Coating Characteristics Obtained with mix B (Example 2)

| Filming conditions temperature and time | 270°C; 90 seconds | 270°C; 120 seconds | 280°C; 90 seconds | 280°C; 120 seconds | 290°C; 90 seconds | 290°C; 120 seconds | 300°C; 90 seconds | 300°C; 120 seconds | Substrate |
|---|---|---|---|---|---|---|---|---|---|
| % Adherence after bending and boiling in H₂O for 30 minutes | none none | none 100% | none 80% | none 100% | none 100% | none 100% | none 100% | none 100% | Aluminum Bright steel |
| Resistance to bending (a) | 1 T / O T | 1 T / O T | 1 T / 1 T | 1 T / 1 T | O T / 1 T | O T / 1 T | O T / 1 T | O T / 1 T | Aluminum Bright steel |
| Pencil hardness | H | H | H | H | H | H | H | H | Aluminum and Bright steel |

(a) See note to Table II.

TABLE IV

Resistance Characteristics of Coatings Obtained with mixes of type (A) (see Example 2)

| Type of Substrate | Thermal treatment (filming) seconds / °C | Thickness of the film in microns | Erichsen drawing test (1) | Shock-resistance (2) mm. | Resistance in saline mist (3) Bubbles | Rust (4) |
|---|---|---|---|---|---|---|
| Aluminum | 90 / 280 | 13 – 15 | 7.3 | excellent | absent | absent |
| " | 120 / 280 | 13 – 15 | 7.5 | " | " | " |
| " | 90 / 290 | 16 – 18 | 7.5 | " | " | " |
| " | 120 / 290 | 18 – 20 | 7.2 | " | " | " |
| " | 90 / 300 | 18 – 20 | 7.8 | " | " | " |
| " | 120 / 300 | 13 – 15 | 7.6 | " | " | " |
| Iron | 90 / 280 | 15 – 17 | 10 | " | 6M | 30 |
| " | 120 / 280 | 13 – 15 | 10 | " | 5–6M | 30 |
| " | 90 / 290 | 15 – 18 | 10 | " | 6M | 30 |
| " | 120 / 290 | 16 – 18 | 10 | " | 4–5M | 30 |
| " | 90 / 300 | 13 – 15 | 10 | " | 5M–D | 30 |
| " | 120 / 300 | 14 – 16 | 10 | " | 5–6M | 30 |
| Phosphatated iron | 120 / 280 | 15 – 18 | 10 | " | 9F | 10 |
| " | 120 / 290 | 16 – 18 | 10 | " | 8F | 5 |
| " | 120 / 300 | 16 – 18 | 10 | " | 8F | 5 |

(1) Determined on an Erichsen apparatus Model 225D.
(2) See note to Table I.
(3) Duration of test: 300 hours.
(4) This datum indicates the percentage of the surface of the specimen attacked by rust.

TABLE V

Resistance Characteristics of the Coatings Obtained with the mixes of Type (B) - (see Example 2)

| Type of substrate | Thermal treatment (filming) seconds | °C | Thickness of the film in microns | Erichsen drawing test (1) | Impact Resistance (2) mm. | Resistance to saline mist (3) Bubbles | Rust (4) |
|---|---|---|---|---|---|---|---|
| Aluminum | 120 | 270 | 15 – 18 | 7.5 | excellent | absent | absent |
| " | 120 | 280 | 18 – 20 | 7.3 | " | " | " |
| " | 90 | 300 | 18 – 20 | 7.2 | " | " | " |
| " | 120 | 300 | 18 – 20 | 6.4 | " | " | " |
| Iron | 90 | 270 | 18 – 20 | 10 | " | 5M | 40 |
| " | 120 | 270 | 15 – 18 | 10 | " | 5–6F | 40 |
| " | 90 | 280 | 18 – 20 | 10 | " | 6M–D | 50 |
| " | 120 | 280 | 16 – 18 | 10 | " | 5M | 40 |
| " | 90 | 300 | 18 – 20 | 9.7 | " | 5M | 40 |
| " | 120 | 300 | 15 – 16 | 9.5 | " | 6–7M | 40 |
| Phosphatated iron | 120 | 270 | 15 – 16 | 10 | " | 8D 30% | 8 |
| " | 120 | 280 | 18 – 20 | 10 | " | 7F | 8 |
| " | 120 | 300 | 14 – 16 | 9.7 | " | 7M | 10 |

(1) Determined on an Erichsen apparatus Model 225D.
(2) See note to Table I.
(3) Duration of test: 300 hours.
(4) This datum indicates the percentage of the surface of the specimen attacked by rust.

EXAMPLE 3

A coating composition was prepared using a two-step process comprising first dispersing the various components set forth below in a Cowles stirrer and subsequently grinding the resultant mass in a ball mill for 24 hours.

The recipe for the composition was as follows:

| | |
|---|---|
| E-TFE copolymers (1) | 40 parts |
| dimethylphthalate | 120 parts |
| dibutylphthalate | 9 parts |
| isophorone | 8 parts |
| toluene | 1 part |
| butyrolactone | 2 parts |

(1) A mechanical mixture consisting of 20 parts of a copolymer containing 41 mol % of tetrafluoroethylene and 20 parts of a copolymer containing 55 mol % of tetrafluoroethylene.

This composition was spread onto sheets of steel and chromate treated aluminum, by means of a film spreader (No. 40). Filming in an oven for 2 minutes was effected at three different temperatures, i.e.: 280°C, 290°C and 300°C.

In all three cases, coatings of 12 micron thickness were obtained, all of which had an excellent appearance and were free of any flaws. The bending resistance (measured in accordance with the description in footnote 4 of Table 1) was OT and the coatings remained unchanged. The bending resistance as described in footnote 5 of Table I, amounted to 100%. The hardness, measured with a pencil, was 2H for the steel substrates and F for the chromate treated substrates.

EXAMPLE 4

Example 3 was repeated, except that as the E-TFE copolymers, mechanical mixtures were used as follows:

| | | | |
|---|---|---|---|
| copolymer having 55 mol % of tetra fluoroethylene | 90 | 50 | 20 |
| copolymer having 68 mol % of tetra fluoroethylene with a melting point of about 250°C | 10 | 50 | 80 |

In all these instances, the coatings were perfect; the characteristics of the films were altogether identical with those found for the films of Example 3.

The resistance to weather aging, after many thousands of hours of outside exposure was definitely more marked than that which was observed for the compositions of Example 3.

Variations can, of course, be made without departing from the spirit and scope of the invention.

Having thus described our invention, what we desire to secure by Letters Patent and hereby claim is:

1. A coating composition comprising an ethylenetetrafluoroethylene copolymer mixture and at least one latent solvent, said ethylene-tetrafluoroethylene copolymer mixture being constituted by
    a. 10–90% of at least one ethylene-tetrafluoroethylene copolymer having a melting point from about 250° to about 315°C. and containing between 52 and 58 mol % of chemically combined tetrafluoroethylene, and
    b. 90–10% of at least one ethylene-tetrafluoroethylene copolymer having a melting point from about 180° to about 285°C. and containing from 35 to 45 mol % of chemically combined tetrafluoroethylene.

2. A coating composition according to claim 1, and being capable of undergoing film formation upon being heated at a temperature between 260° and 300°C., for between 1 and 2 minutes.

3. A coating composition according to claim 1, and further comprising at least one fluidizing solvent.

4. A coating composition according to claim 1, and further comprising at least one pigment.

5. A coating composition according to claim 3, and further comprising at least one pigment.

6. A coating composition according to claim 1, and further comprising at least one inert filler.

7. A coating composition according to claim 3, and further comprising at least one inert filler.

8. A coating composition according to claim 1, and further comprising at least one additive selected from the group consisting of surfactants, stabilizers, antioxidants and ultraviolet absorbers.

9. A coating composition according to claim 3, and further comprising at least one additive selected from the group consisting of surfactants, stabilizers, antioxidants and ultraviolet absorbers.

* * * * *

PO-1050
(5/69)

UNITED STATES PATENT OFFICE
CERTIFICATE OF CORRECTION

Patent No. 3,906,060               Dated    September 16, 1975

Inventor(s)  Andrea MATTIUSSI and Mario MODENA

It is certified that error appears in the above-identified patent and that said Letters Patent are hereby corrected as shown below:

Column 5, line 6: "resistance to aging; aging:" should read -- resistance to aging: --.

Columns 7-8, the heading of Table IV, column 4:
"Erichsen"  should read  -- Erichsen --.
  drawing                    drawing
  test (1)                   test (1)
                               mm.

Columns 7-8, the heading of Table IV, column 5:
"Shock-      "    should read -- Shock-     --.
  resistance                  resistance
  (2)                         (2)
  mm.

Columns 9-10, the heading of Table V, column 4:
"Erichsen"  should read  -- Erichsen --.
  drawing                    drawing
  test (1)                   test (1)
                               mm.

PO-1050
(5/69)

UNITED STATES PATENT OFFICE
CERTIFICATE OF CORRECTION

Patent No. 3,906,060                Dated  September 16, 1975

Inventor(s)  Andrea MATTIUSSI and Mario MODENA          Page - 2

It is certified that error appears in the above-identified patent and that said Letters Patent are hereby corrected as shown below:

Columns 9-10, the heading of Table V, column 5:

"Impact          " should read   -- Impact         --.
 Resistance                         Resistance
 (2)                                (2)
 mm.

Signed and Sealed this sixth Day of January 1976

[SEAL]

Attest:

RUTH C. MASON  
Attesting Officer

C. MARSHALL DANN  
Commissioner of Patents and Trademarks